United States Patent
Carr et al.

(10) Patent No.: US 9,418,351 B2
(45) Date of Patent: Aug. 16, 2016

(54) AUTOMATED NETWORK INVENTORY USING A USER DEVICE

(75) Inventors: Jeffrey T. Carr, Highland Village, TX (US); Mohsin A. Karim, Plano, TX (US); Warren Thompson, Irving, TX (US); Mike R. Blasius, Flowermound, TX (US); Jonathan Allen, Coppell, TX (US); David Jones, Lewisville, TX (US); Neil Tolentino, Irving, TX (US); Fahd Bhatty, Farmers Branch, TX (US); Awais Iqbal, Irving, TX (US)

(73) Assignees: Verizon Patent and Licensing Inc., Basking Ridge, NJ (US); Verizon North, LLC, Philadelphia, PA (US)

( * ) Notice: Subject to any disclaimer, the term of this patent is extended or adjusted under 35 U.S.C. 154(b) by 1261 days.

(21) Appl. No.: 13/331,081

(22) Filed: Dec. 20, 2011

(65) Prior Publication Data

US 2013/0159862 A1 Jun. 20, 2013

(51) Int. Cl.
*G06F 3/048* (2013.01)
*G06Q 10/08* (2012.01)
*H04W 4/02* (2009.01)

(52) U.S. Cl.
CPC .............. *G06Q 10/087* (2013.01); *H04W 4/02* (2013.01)

(58) Field of Classification Search
CPC ................................ H04L 41/08; G06F 11/00
See application file for complete search history.

(56) References Cited

U.S. PATENT DOCUMENTS

| | | | | |
|---|---|---|---|---|
| 7,876,322 B2* | 1/2011 | Xie | ......................... | G06T 17/20 345/428 |
| 9,104,695 B1* | 8/2015 | Cervelli | ............ | G06F 17/30241 |
| 2003/0109267 A1* | 6/2003 | Bulut | .................... | H04W 64/00 455/457 |
| 2004/0176168 A1* | 9/2004 | Tsao | ....................... | A63F 13/12 463/42 |
| 2006/0169470 A1* | 8/2006 | Bell | ......................... | H02G 7/02 174/40 CC |
| 2007/0112649 A1* | 5/2007 | Schlabach | ........... | G06F 19/3406 705/28 |
| 2007/0219916 A1* | 9/2007 | Lucas | .................... | G06Q 10/08 705/58 |
| 2008/0208897 A1* | 8/2008 | Lew | .................. | G06F 17/30539 |
| 2010/0306305 A1* | 12/2010 | DeHaan | .................. | H04L 41/12 709/203 |
| 2013/0029587 A1* | 1/2013 | Gandhi | ................. | H04W 16/20 455/7 |

* cited by examiner

*Primary Examiner* — Matthew Ell
*Assistant Examiner* — Mohamed Abou El Seoud

(57) ABSTRACT

A system configured to receive a request to perform a survey on a piece of equipment associated with a network; and present, for display, a user interface that allows a user, of the user device, to enter equipment information, associated with the piece of equipment, where the equipment information includes information that uniquely identifies the piece of equipment, information associated with a location of the piece of equipment, or information that identifies ownership of the piece of equipment. The system is also configured to receive, via the user interface, the equipment information; and transmit the equipment information to a server device.

25 Claims, 7 Drawing Sheets

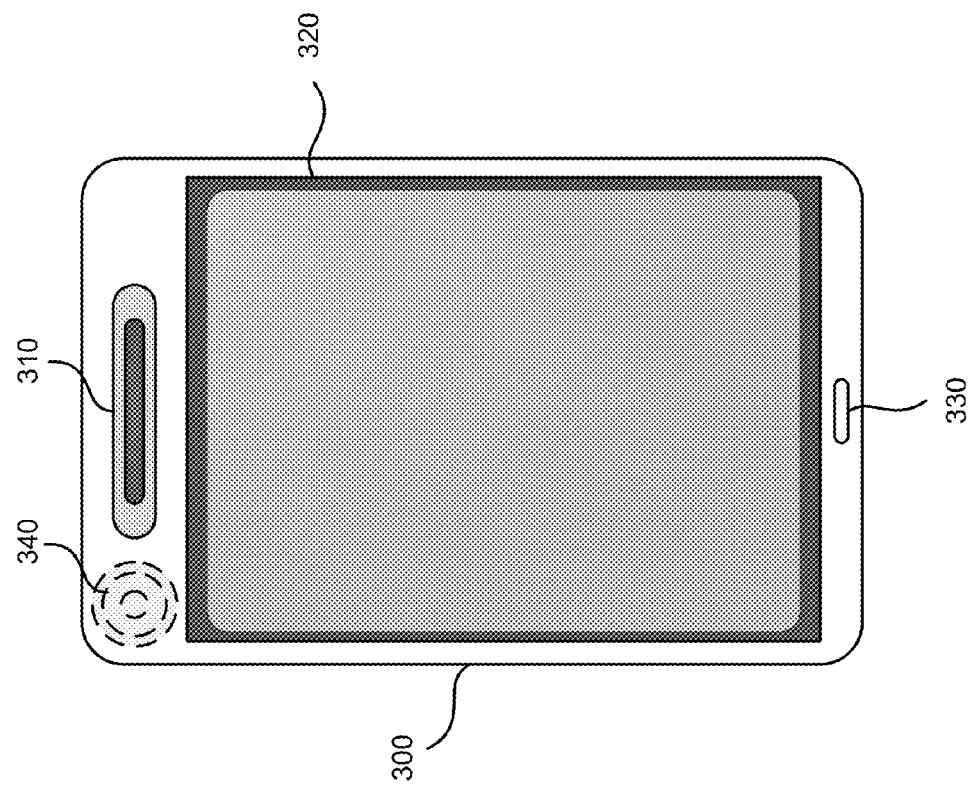

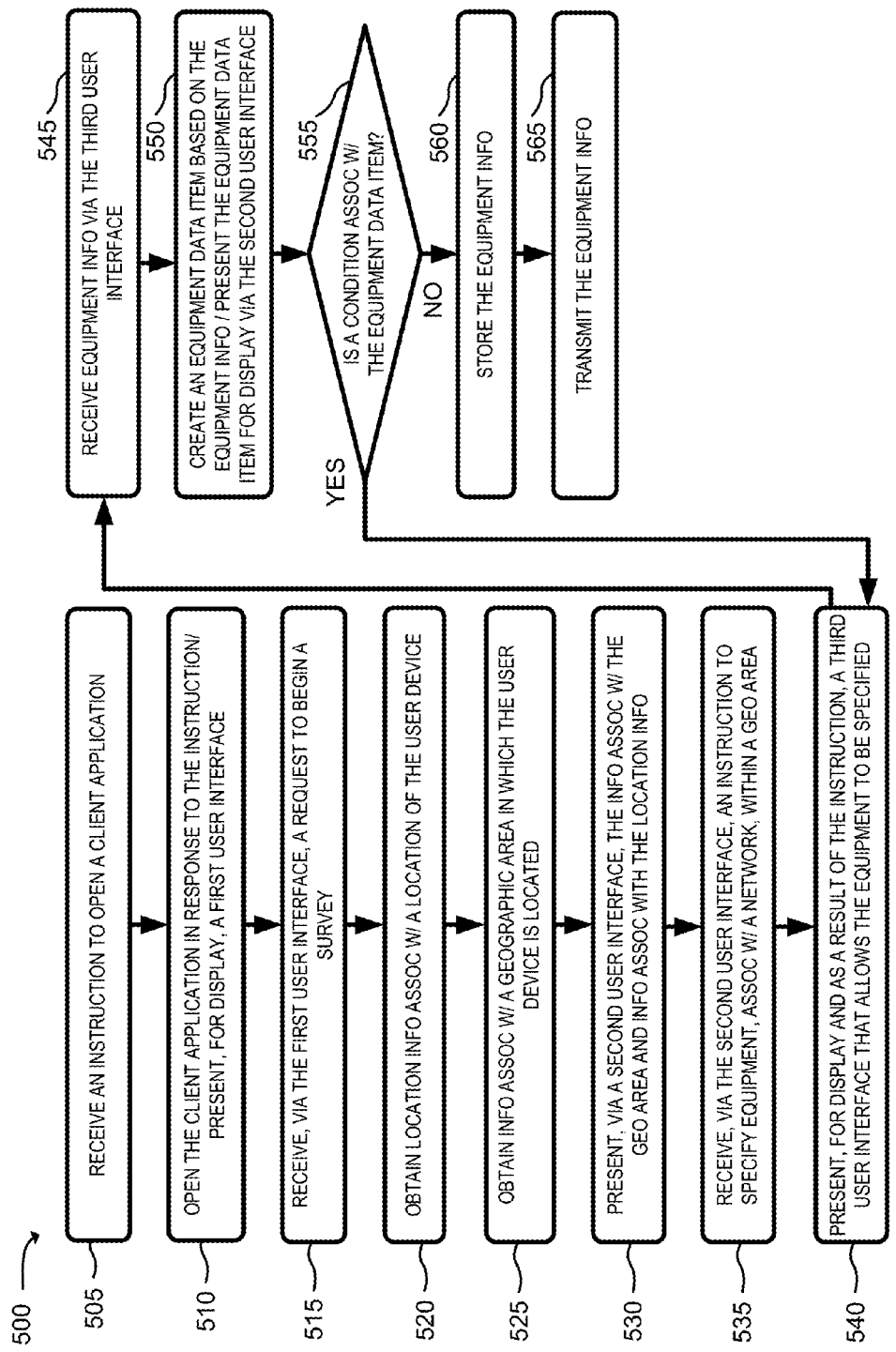

1

AUTOMATED NETWORK INVENTORY USING A USER DEVICE

BACKGROUND

Computing and communication devices are capable of performing an increasing variety of functions and tasks that continue to improve the user's experience. For example, computing and communication devices can run a variety of applications, can connect to a variety of wired and wireless networks to receive services, can perform point of sale transactions to purchase goods and/or services, and/or can download content, which can be stored and/or displayed on the computing and communicating devices.

A wired and/or wireless network may include a variety of network devices that are distributed over a geographic area. As the network is expanded, updated, or maintained over a period of time, a survey of the network is usually performed to update an inventory of the devices associated with the network. It is sometimes difficult to distinguish between a device associated with the network and another device, associated with another network, particularly when the device and the other device are located within a close proximity of each other.

BRIEF DESCRIPTION OF THE DRAWINGS

FIG. 3 is a diagram of an example user device, as shown in FIG. 1;

FIG. 4 is a flow chart of an example process for registering a user device to obtain a client application according to an implementation described herein;

FIG. 5 is a flow chart of an example process for performing a survey and/or managing an inventory of equipment associated with a network according to an implementation described herein.

DETAILED DESCRIPTION OF PREFERRED EMBODIMENTS

Figure 1:
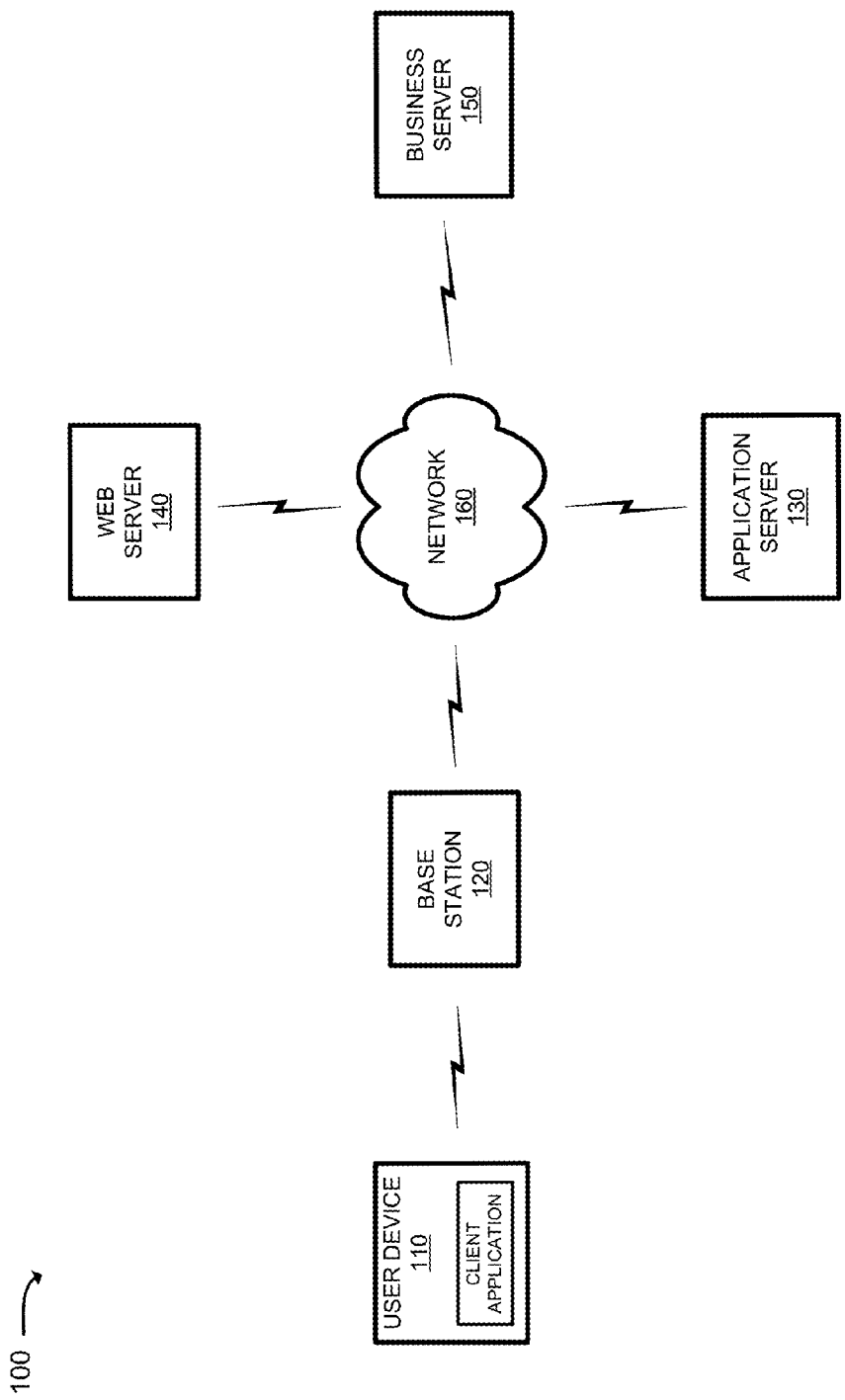
FIG. 1 is a diagram of an example environment in which systems and/or methods described herein may be implemented.

The following detailed description refers to the accompanying drawings. The same reference numbers in different drawings may identify the same or similar elements.

A system and/or method, described herein, may enable a user device to perform a survey of equipment associated with a network. The equipment may include network devices (e.g., nodes, servers, base stations, switches, etc.), utility poles and/or towers on which transmission lines are installed (e.g., communication cables, antennas, power cables, etc.), and/or other equipment associated with the network.

The system and/or method may allow the user device to identify a location of a piece of equipment (e.g., a utility pole, etc.), when the user is located adjacent to the equipment (e.g., when the user stands next to the utility pole, etc.) and instructs the user device to store a geographic location associated with the user device. The system and/or method may allow information associated with the equipment (hereinafter referred to as "equipment information") to be specified by the user and/or or stored on the user device. The equipment information may include the information associated with a type of equipment, information associated with a geographic location of the equipment (e.g., that identifies latitude, longitude, grid coordinates, etc.), information associated with an owner of the equipment (e.g., a business name, a utility company, a government entity, etc.), an image and/or video associated with the equipment, etc. The system and/or method may allow the user device to transmit the equipment information to a business server that maintains an inventory associated with equipment associated with the network.

The system and/or method may allow the user device to obtain information associated with a geographic area in which the user device is located and may present a user interface that includes the information associated with the geographic area (e.g., topographical information, satellite imagery, geo-political boundaries, transportation routes, etc.). The system and/or method may allow the user device to present, via the user interface, one or more data items that represent one or more pieces of equipment, associated with a network, within the geographic area, based on equipment information. The system and/or method may allow a user to select a data item, via the user interface, which may cause the user device to display, via the user interface, equipment information associated with the selected data item. The system and/or method may allow the user to add or delete a data item via the user interface. Adding or deleting the data item may indicate that equipment is to be installed within or removed from the geographic area, respectively, at a location that corresponds to a point, within the user interface, identified by the user. The user device may transmit a notification indicating that the equipment is to be installed at or removed from the location that corresponds to the point, within the user interface, that the data item was added or removed, respectively.

The system and/or method may allow the user device and/or the business server to manage an inventory of the equipment, associated with the network, based on equipment information that is stored in a memory associated with the user device and/or the business server, respectively. The system and/or method may determine that a condition is associated with the equipment information (e.g., if a relative distance between adjacent pieces of equipment is greater than a threshold) and may allow the user to edit the equipment information to remedy the condition. The system and/or method may automatically propose that equipment be modified or installed to remedy the condition and/or to facilitate planning, engineering and/or construction of a network.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

FIG. 1 is a diagram of an example environment 100 in which systems and/or methods described herein may be implemented. As shown in FIG. 1, environment 100 may include a user device 110, a base station 120, an application server 130, a web server 140, a business server 150, and/or a network 160. The number of devices and/or networks, illustrated in FIG. 1, is provided for explanatory purposes only. In practice, there may be additional networks and/or devices, fewer networks and/or devices, different networks and/or devices, or differently arranged networks and/or devices than illustrated in FIG. 1.

Also, in some implementations, one or more of the devices of environment 100 may perform one or more functions described as being performed by another one or more of the devices of environment 100. For example, application server 130 and business server 150 may be integrated into a single device. Components of environment 100 may interconnect via wired connections, wireless connections, or a combination of wired and wireless connections.

User device 110 may include any computation or communication device, such as a wireless mobile communication device, that is capable of communicating with network 160. For example, user device 110 may include a radiotelephone, a personal communications system (PCS) terminal (e.g., such as a smart phone that may combine a cellular radiotelephone with data processing and data communications capabilities), a personal digital assistant (PDA) (e.g., that can include a radiotelephone, a pager, Internet/intranet access, etc.), a laptop computer, a tablet computer, a personal computer, a camera, a wireless gaming system, or another type of computation or communication device.

In one example implementation, user device 110 may include a global positioning satellite (GPS) component that communicates with a GPS constellation to obtain location information associated with user device 110. In another example implementation, user device 110 may include another component that generates location information, associated with user device 110, that identifies a precise location (e.g., within a geographic area that is less than a threshold). The other component may identify the precise location based on signals from the GPS components, by identifying distances between user device 110 and one or more base stations 120 (e.g., using a triangulation scheme), and/or by communicating with another systems (e.g., a long range navigation (LORAN) system, a global navigation satellite system (GNSS), etc.) to identify the precise location.

User device 110 may host a client application to allow user device 110 to perform operations associated with an equipment survey and/or to manage an inventory of equipment associated with a network. User device 110 may communicate with application server 130 to download the client application and/or register user device 110 and/or the client application.

User device 110 may identify a location associated with a piece of equipment within the network and may use the client application to specify equipment information (e.g., via a user interface that allows the user to enter the equipment information) associated with the equipment. User device 110 may allow an image and/or video to be taken of the equipment and may store the image and/or video as part of the equipment information. User device 110 may transmit, via base station 120 and/or network 160, the equipment information to application server 130 and/or business server 150.

User device 110 may obtain, from web server 140, information associated with a geographic area in which all or a portion of the network is located. User device 110 may use the client application to present a user interface that identifies data items and/or symbols that represent equipment associated with the network. The position of the data items and/or symbols, within the user interface, may correspond to a location of the equipment within the geographic area. A user, of user device 110, may select a object and/or symbol, which may cause the client application to present for display, via user device 110, equipment information, associated with a piece of equipment, that is represented by the selected data item.

User device 110 may process equipment information associated with an inventory of equipment that corresponds to a network. User device 110 may determine whether equipment information, associated with a piece of equipment, has been correctly entered (e.g., is in the correct format, has been completely entered, etc.), is missing, etc. User device 110 may process the equipment information, associated with the inventory, to identify whether a condition, associated with the network and/or inventory, exists. For example, user device 110 may determine whether a cable span between nodes and/or utility poles is greater than a threshold. User device 110 may also, or alternatively, determine whether an angle associated with a cable that is attached to a utility pole is less than a threshold. The angle may be based on a first span of a cable between the utility pole and a first adjacent utility pole and second span of the cable between the utility pole and a second adjacent utility pole. User device 110 may detect a condition when equipment information is missing from an inventory.

User device 110 may display and/or transmit a notification that a condition has been detected. User device 110 may propose that equipment be installed and/or modified when a condition is detected and/or to facilitate planning, engineering, and/or construction of a network. User device 110 may, for example, propose that particular equipment be installed to remedy the condition (e.g., install or position a pole to reduce a distance and/or angle between adjacent equipment). User device 110 may propose one or more pieces of equipment be installed, at respective locations, to establish a new network path identified by a user of user device 110.

Application server 130 may include one or more server devices, or other types of computation or communication devices, that gather, process, search, store, and/or provide information in a manner described herein. Application server 130 may communicate via network 160. Application server 130 may transmit a client application, to user device 110, in response to a registration request received from user device 110. Application server 130 may obtain, from the registration request, information associated with user device 110 and may register user device 110 based on the information associated with user device 110.

Application server 130 may provide a service (e.g., a web service) that allows user device 110 to perform, in a manner similar to that described above, operations associated with an equipment survey and/or to manage an inventory of equipment associated with a network. Application server 130 may receive equipment information associated with one or more pieces of equipment included within the equipment inventory and may transmit the equipment information to business server 150.

Web server 140 may include one or more server devices, or other types of computation or communication devices, that gather, process, search, store, and/or provide information in a manner similar to that described herein. Web server 140 may communicate via network 160. In one example implementation, web server 140 may host a website associated with a mapping application (e.g., such as Google Maps, Mapquest, etc.). Web server 140 may receive, from user device 110, a request for information associated with a geographic area. Web server 140 may, in response to the request, retrieve information associated with the geographic area and may transmit the information, associated with the geographic area, to user device 110. The information associated with the geographic area may identify topographical features (e.g., rivers, streams, mountains, forest, elevation, etc.), geopolitical boundaries (e.g., boarders associated with countries, states, counties, zip codes, etc.), map information (e.g., roads, bridges, intersections, traffic patterns, route numbers, street names, etc.), etc.

Business server 150 may include one or more server devices, or other types of computation or communication devices, that gather, process, search, store, and/or provide information in a manner similar to that described herein. Business server 150 may communicate via network 160. In one example implementation, business server 150 may perform operations associated with managing an inventory of equipment associated with a network (e.g., network 160). Business server 150 may, for example, receive, from user device 110, equipment information that was obtained as a result of one or more equipment surveys performed by user device 110. Business server 150 may store the equipment information in a memory associated with business server 150.

Business server 150 may process the equipment information, in a manner similar to that described above, to identify equipment information that does not conform to a format or that is missing. Business server 150 may also, or alternatively, process the equipment information to identify conditions, associated with the inventory, such as to identify existing equipment for which equipment information has not been collected. Business server 150 may also, or alternatively, identify conditions associated with the network, such as when a cable span, between adjacent nodes or utility poles, is greater than a threshold and/or when a distance between adjacent cell towers is greater than a threshold. Based on an identification of a condition, associated with the inventory, business server 150 may transmit a notification, to user device 110, for a survey to be conducted to obtain equipment information, associated with existing equipment. Based on an identification of a condition, associated with the network, business server 150 may transmit a notification that a maintenance action, an upgrade, and/or an equipment install or removal is to be performed.

Network 160 may include one or more wired and/or wireless networks. For example, network 160 may include a cellular network, a public land mobile network (PLMN), a second generation (2G) network, a third generation (3G) network, a fourth generation (4G) network (e.g., a long term evolution (LTE) network), a fifth generation (5G) network, and/or another network. Additionally, or alternatively, network 160 may include a wide area network (WAN), a metropolitan network (MAN), a telephone network (e.g., the Public Switched Telephone Network (PSTN)), an ad hoc network, an intranet, the Internet, a fiber optic-based network, and/or a combination of these or other types of networks.

Figure 2:
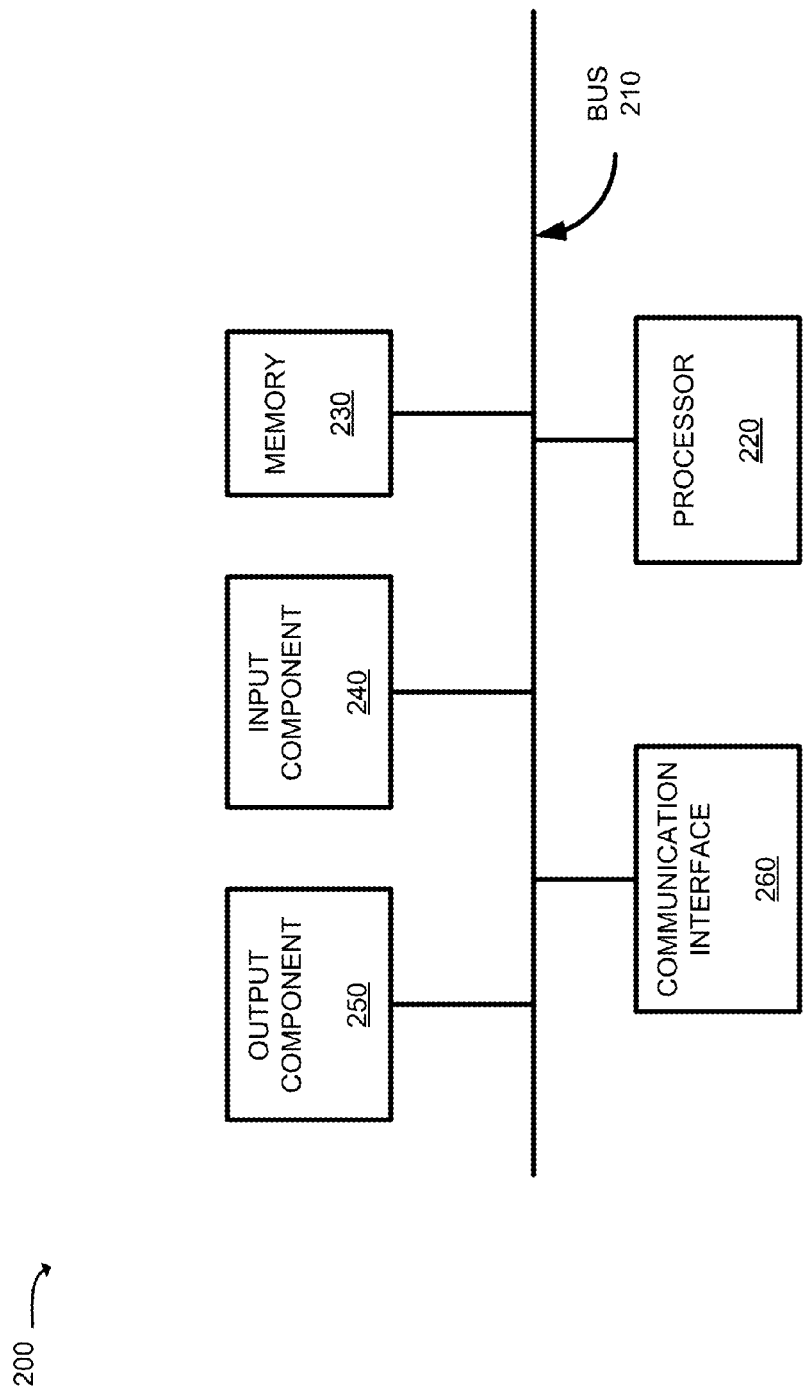
FIG. 2 is a diagram of example components of one or more of the devices of FIG. 1.

FIG. 2 is a diagram of example components of a device 200 that may correspond to one of the devices of environment 100. In one example implementation, one or more devices of environment 100 may include one or more devices 200. As illustrated, device 200 may include a bus 210, a processor 220, a memory 230, an input component 240, an output component 250, and a communication interface 260.

Bus 210 may permit communication among the components of device 200. Processor 220 may include one or more processors or microprocessors that interpret and execute instructions. In other implementations, processor 220 may be implemented as or include one or more ASICs, FPGAs, or the like.

Memory 230 may include a RAM or another type of dynamic storage device that stores information and instructions for execution by processor 220, a ROM or another type of static storage device that stores static information and instructions for the processor 220, and/or some other type of magnetic or optical recording medium and its corresponding drive for storing information and/or instructions.

Input component 240 may include a device that permits an operator to input information to device 200, such as a keyboard, a keypad, a mouse, a pen, a microphone, one or more biometric mechanisms, and the like. Output component 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 160.

As described herein, device 200 may perform certain operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

FIG. 3 is a diagram of an example user device 110. As shown in FIG. 3, user device 110 may include a housing 300, a speaker 310, a display 320, a microphone 330, and/or a camera 340. Housing 300 may include a chassis via which some or all of the components of user device 110 are mechanically secured and/or covered. Speaker 310 may include a component to receive input electrical signals from user device 110 and transmit audio output signals, which communicate audible information to a user of user device 110.

Display 320 may include a component to receive input electrical signals and present a visual output in the form of text, images, videos, and/or combinations of text, images, and/or videos which communicate visual information to the user of user device 110. In one implementation, display 320 may display text input into user device 110, text, images, and/or video received from another device, and/or information regarding incoming or outgoing calls or text messages, emails, media, games, phone books, address books, the current time, etc.

Display 320 may be a touch screen that presents one or more images that corresponds to control buttons. The one or more images may accept, as input, mechanical pressure from the user (e.g., when the user presses or touches an image corresponding to a control button or combinations of control buttons) and display 320 may send electrical signals to processor 220 that may cause user device 110 to perform one or more operations. For example, the control buttons may be used to cause user device 110 to transmit information. Display 320 may present one or more other images associated with a keypad that, in one example, corresponds to a standard telephone keypad or another arrangement of keys.

Microphone 330 may include a component to receive audible information from the user and send, as output, an electrical signal that may be stored by user device 110, transmitted to another user device, or cause the device to perform one or more operations. Camera 340 may be provided on a front and/or back side of user device 110, and may include a component to receive, as input, analog optical signals and send, as output, a digital image or video that can be, for example, viewed on display 320, stored in the memory of user device 110, discarded and/or transmitted to another user device 110.

Although FIG. 3 depicts example components of user device 110, in other implementations, user device 110 may include fewer components, additional components, different components, or differently arranged components than illustrated in FIG. 3. For example, user device 110 may include a keyboard, a keypad, and/or other input components. In still other implementations, one or more components of user device 110 may perform one or more tasks described as being performed by one or more other components of user device 110.

FIG. 4 is a flow chart of an example process 400 for registering user device 110 with application server 130. In one example implementation, process 400 may be performed by user device 110. In another example implementation, some or all of process 400 may be performed by a device or a collection of devices separate from, or in combination with, user device 110.

As shown in FIG. 4, process 400 may include transmitting, to an application server, a request to register a user device (block 405) and receiving, from the application server, a client application (block 410). For example, a user, associated with user device 110, may desire to perform an equipment survey and may instruct user device 110 to download a client application. User device 110 may receive the instruction and may transmit, to application server 130, a request to register user device 110. Application server 130 may receive the request and may use information, associated with user device 110, obtained from the request, to register user device 110. The information associated with user device 110 may include a unique identifier (e.g., a mobile directory number (MDN), etc.), a network address (e.g., an Internet protocol (IP) address, a media access control (MAC) address, etc.), information associated with the user (e.g., a username, password, personal identification number (PIN), etc.), etc.

Application server 130 may, for example, compare information, associated with user device 110, with other information, associated with user device 110, stored in a memory associated with application 120. Application server 130 may not register user device 110 based on a determination that the information, associated with user device 110, does not match the other information, associated with user device 110, stored in the memory.

In another example, application server 130 may register user device 110 based on a determination that the information, associated with user device 110, matches the other information, associated with user device 110, stored in the memory. Application server 130 may transmit, to user device 110, a client application as a result of registering user device 110. Additionally, or alternatively, application server 130 may generate unique registration information (e.g., login credentials, a key, a unique registration number and/or string of characters, etc.), associated with user device 110, and may transmit, to user device 110, the registration information. User device 110 may receive, from application server 130, the client application and/or the registration information.

As also shown in FIG. 4, process 400 may include installing the client application on the user device (block 415). For example, user device 110 may store the client application and/or the registration information in a memory associated with user device 110. User device 110 may also, or alternatively, cause the client application to execute. The client application may, as a result of executing, generate an icon and/or a data item, associated with the client application, that may be displayed, by user device 110 when user device 110 is powered up. The icon and/or data item may allow the user, associated with user device 110, to select the icon and/or data item, which may cause the client application to open and/or present a user interface that allows an equipment survey to be conducted using user device 110.

FIG. 5 is a flow chart of an example process for performing a survey and/or managing an inventory of equipment associated with a network according to an implementation described herein. In an example implementation, process 500 may be performed by user device 110. In another example implementation, some or all of process 500 may be performed by a device or a collection of devices separate from, or in combination with, user device 110. FIGS. 6A-6D are diagrams of example user interfaces, associated with the client application, that are capable of being presented on user device 110. A portion of process 500 is described below with references to the user interfaces shown in FIGS. 6A-6D.

Figures 6A, 6B:
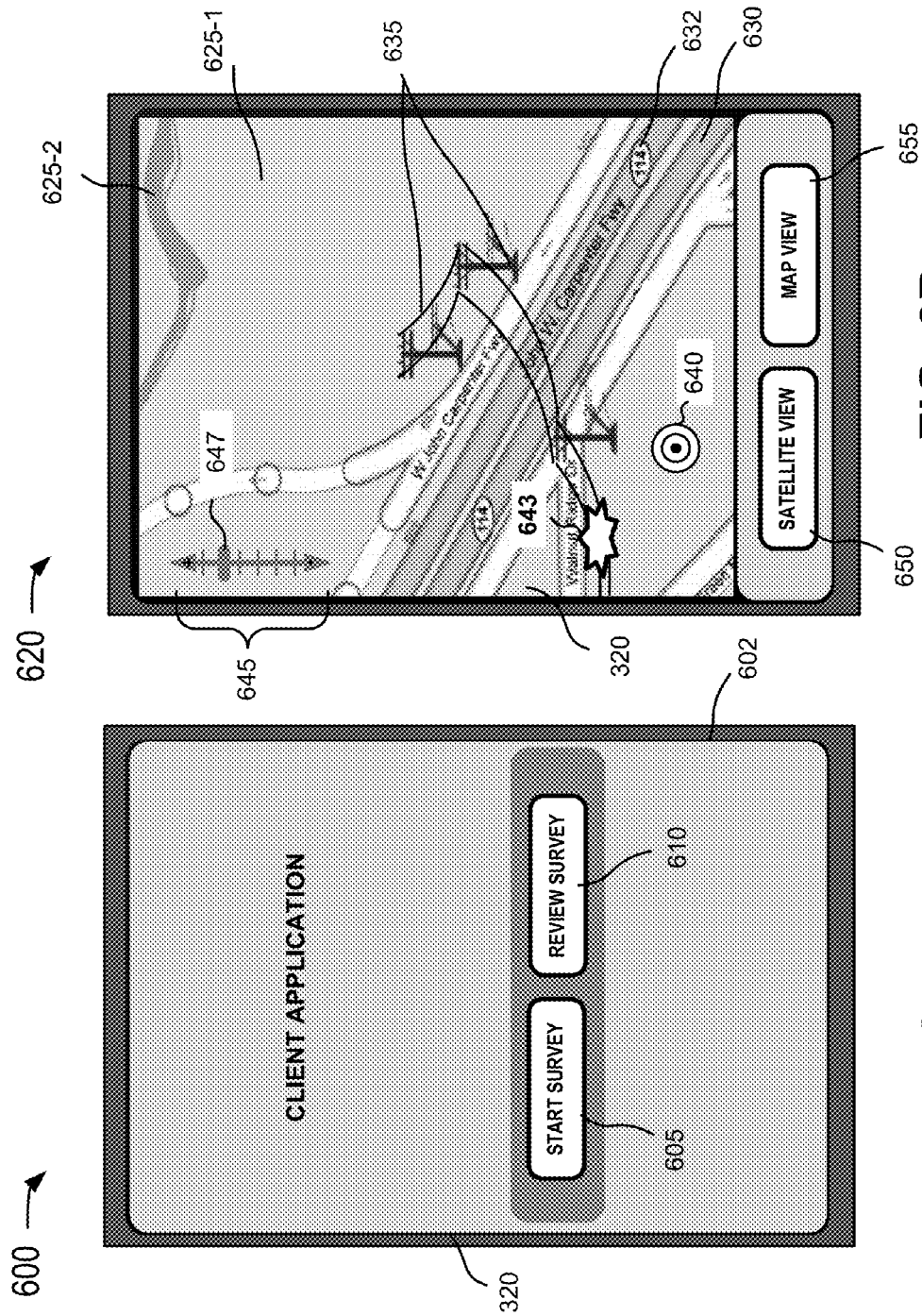
FIGS. 6A-6D are diagrams of example user interfaces, associated with the client application, that are capable of being presented on the user device of FIG. 1.

As shown in FIG. 5, process 500 may include receiving an instruction to open a client application (block 505), opening a client application in response to the instruction, and presenting, for display, a first user interface (block 510). For example, a user device 110 may receive an instruction, from a user of user device 110, to open a client application, hosted by user device 110. User device 110 may, in response to the request, open the client application, which may cause the client application to present, for display on user device 110, a first user interface associated with the client application. FIG. 6A is a diagram of an example a first user interface 600 associated with client application. First user interface 600 may be displayed on user device 110 (e.g., on display 320 of FIG. 3). As shown in FIG. 6A, first user interface 600 may include a background field 602, a start survey button 605, and a review survey button 610.

Start survey button 605 may, when selected by the user, allow user device 110 to initiate an equipment survey. The user may select start survey button 605 by touching start survey button 605 with a pointing device (e.g., a mouse, a wand, etc.), a finger, etc., and/or by pressing one or more keys on a keyboard associated with user device 110. Review survey button 610 may, when selected by the user, cause user device 110 to retrieve, from a memory associated with user device 110, equipment information pertaining to one or more pieces of equipment, associated with a network (e.g., network 160), that was obtained at a prior point in time. User device 110 may present the equipment information, for display on user device 110 (e.g., via a table, a data structure, etc.), that allows the user to view the equipment information associated with the prior survey. In another example implementation, user device 110 may, as a result of the user selecting review survey button 610, communicate with business server 150 to obtain the equipment information.

Returning to FIG. 5, process 500 may include receiving, via the first interface, a request to begin a survey (block 515) and obtaining location information associated with a location of the user device (block 520). For example, user device 110 may receive, via first user interface 600, an instruction to initiate an equipment survey (e.g., when the user selects start survey button 605). The client application may communicate with a particular component, associated with user device 110, to obtain location information, associated with a location of user device 110. The particular component may, for example, correspond to a GPS-based component that identifies a location at which user device 110 is located. Additionally, or alternatively, the client application may cause user device 110 to identify the location of user device 110 based on a relative position between one or more base stations 120 (e.g., based on a triangulation scheme). Additionally, or alternatively, user device 110 may communicate with one or more devices (e.g., associated with a LORAN system, a GNSS service, etc.) that enable user device 110 to identify the location of user device 110.

As also shown in FIG. 5, process 500 may include obtaining information associated with a geographic area in which user device 110 is located (block 525), and presenting, via a second user interface, the information associated with the geographic area and/or the location information (block 530). For example, user device 110 may communicate with web server 140, via base station 120, to obtain information associated with a geographic area in which user device 110 is located. Web server 140 may, as a result of the communication, identify a geographic area in which user device 110 is located based on the location information obtained from the communication. Web server 140 may transmit, to user device 110, information associated with the geographic area. The information associated with the geographic area may identify topographical features, geopolitical boundaries, map information, satellite imagery, etc. associated with the geographic area.

User device 110 may receive the information, associated with the geographic area, and the client device may present the location information and/or the information associated with the geographic area for display, via a second user interface, on user device 110. Additionally, or alternatively, the client application may retrieve, from a memory associated with user device 110, equipment information pertaining to equipment associated with a network (e.g., network 160) that is located within the geographic area. The client application may present for display, via the second user interface, one or more data items that represent the equipment, associated with the network, based on the equipment information.

FIG. 6B is a diagram of a second user interface 620, associated with the client application. As shown in FIG. 6B, second user interface 620 may include a set of topographical data items 625-1 and 625-2, a transportation route data item 630, a route identifier data item 632, a set of legacy equipment data items 635, a current location data item 640, a condition data item 643, a zoom data item 645, a satellite view button 650, and a map view button 655.

The number of data items and/or buttons, illustrated in FIG. 6B, is provided for explanatory purposes only. In practice, there may be additional data items and/or buttons, fewer data items and/or buttons, different data items and/or buttons, or differently arranged data items and/or buttons than illustrated in FIG. 6B.

Topographical data item 625 may represent topographical features associated with a particular geographic area. The topographical features may include rivers, lakes, mountains, forests, swamps, etc. Transportation route data item 630 may represent a transportation route within the particular geographic area, such as a road, street, highway, railroad, etc. Route identifier data item 632 may include information that uniquely identifies a transportation route (e.g., a street name, a route number, and/or some other identifier) corresponding to transportation route data item 630.

Legacy equipment data item 635 may represent a piece of equipment associated with a network within the particular geographic area. In one example, legacy equipment data item 635 may represent a utility pole. In another example, legacy equipment data item 635 may represent a power transmission path and/or a wired or wireless network path (e.g., a power cable, a fiber optic cable, a radio frequency (RF) link, etc.). In yet another example, legacy equipment data item 635 may represent a network device (e.g., a node, a switch, a server device, etc.).

Current location data item 640 may represent a point at which user device 110 is located within the particular geographic area. The point at which user device 110 is located may be based on the location information associated with user device 110. Condition data item 643 may represent a potential condition associated with the network, such as missing equipment information, a distance between adjacent equipment that is greater than a threshold, and/or other conditions. Condition data item 643 may also, or alternatively, represent a potential safety issue associated with the network, such a missing guy wire, damaged equipment, an electrical grounding problem, insufficient clearance with other equipment or objects, etc.

Zoom data item 645 may allow a user, of the user device 110, to zoom in or zoom out of the particular geographic area. For example, the user may zoom into the particular geographic area by selecting control bar 647 and moving control bar 647 in an upward direction. In another example, the user may cause user device 110 to zoom out of the particular geographic area by selecting control bar 647 and moving control bar 647 in a downward direction.

Satellite view button 650 may, when selected by the user, cause an image, associated with the particular geographic area, to be displayed. The image may correspond to a bird's eye view of the particular geographic area that is taken, by a camera, from a satellite, an airplane, etc. Map view button 650 may, when selected by the user, cause a map, associated with the particular geographic area, to be displayed. The map associated with map view button 650 and/or image, associated with satellite view button 650, may identify topographical features (e.g., identified topographical data item 630), transportation routes (e.g., identified by transportation data item 630, transportation route identifiers (e.g., identified by route identifier data item 632), equipment associated with a network (e.g., as identified by legacy equipment data item 635), and/or a location associated with user device 110 (e.g., based on current location data item 640).

Returning to FIG. 5, process 500 may include receiving, via the second user interface, an instruction to specify equipment, associated with a network, within the geographic area (block 535) and presenting for display, as a result of the instruction, a third interface that allows the equipment to be specified (block 540). For example, the user, of user device 110, may be located within a close proximity (e.g., within one foot, three feet, ten feet, etc.) of a piece of equipment, associated with a network (e.g., network 160). The user may select a point, within second user interface 620, that corresponds to a location, within the geographic area, at which the equipment is to be specified. In one example, the user may select a point, within second user interface 620, that corresponds to a current location associated with user device 110 (e.g., when the user touches current location data item 640 within second user interface 620). In another example, the user may select a different point, within second user interface 620, that corresponds to another location, within the geographic area, at which equipment is to be specified. Specifying of the other location may allow the user to identify equipment to be installed, at the other location, in the network (e.g., to remedy a condition, to expand the network, to remedy a safety issue, etc.). Additionally, or alternatively, specifying the different location may allow the user to estimate where inaccessible and/or missing equipment is likely to be located.

Figure 6C:
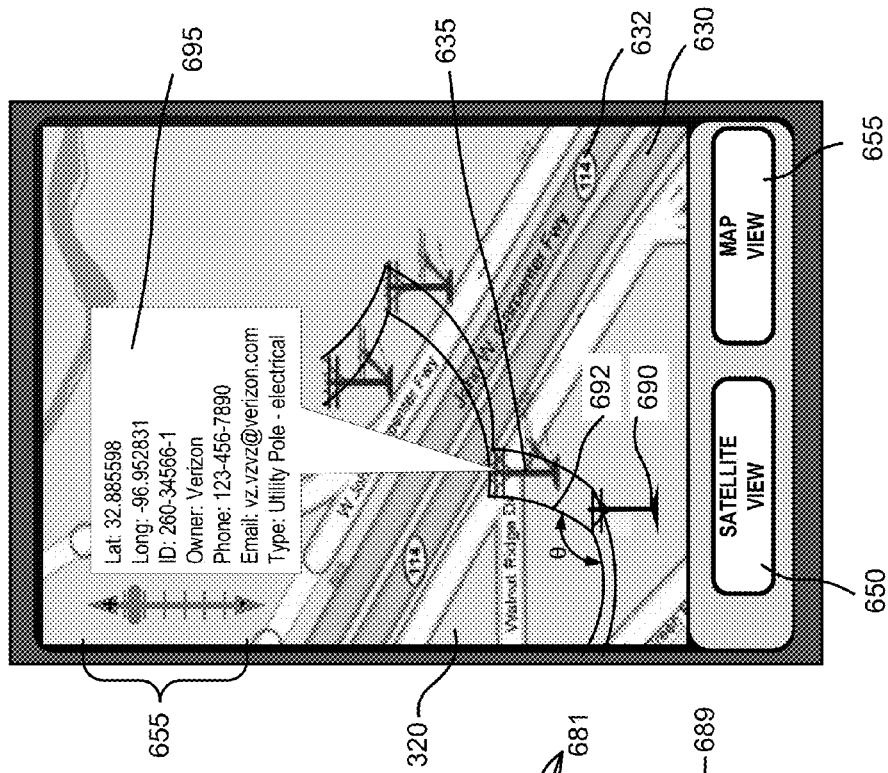

User device 110 may receive, via second user interface 620, selection of the current location and/or the other location and the client application may present a third user interface, associated with the client application (e.g., such as third user interface 660 of FIG. 6C), for display on user device 110. FIG. 6C is a diagram of an example a third user interface 660 associated with client application. As shown in FIG. 6C, third user interface 660 may include a latitude field 665, a longitude field 667, an equipment identifier (ID) field 669, an owner field 671, a phone number (e.g., shown as "no.") field 673, an email field 675, an equipment type field 677, an adjacent equipment (e.g., shown as "Adj. Equip.") field 678, a recording button 679, image/audio fields 681, a save button 683, an edit button 685, an inventory button 687, and a safety and maintenance button 689.

Latitude field 665 and/or a longitude field 667 may identify a location, within the geographic area that corresponds to the selected point, within second user interface 620. Latitude field 665 may, for example, store a value associated with a latitude coordinate and/or some other coordinate (e.g., grid coordinates, map coordinates, etc.) of the identified location within the geographic area. Longitude field 665 may store a value associated with a longitude coordinate and/or some other coordinate (e.g., grid coordinates, map coordinates, etc.) of the identified location within the geographic area. In another example, latitude field and/or longitude field may allow the user, of user device 110, to enter coordinates that correspond to the identified location and/or some other location associated with the geographic area.

Equipment ID field 669 may allow the user to enter information that uniquely identifies the equipment associated with the network. In one example, equipment ID field 669 may store an identifier associated with a utility pole. In another example, equipment ID field 669 may store a serial number and/or some other identifier associated with a network device (e.g., a switch, a node, a server, etc.), etc. Owner field 671 may allow the user to enter information that identifiers the owner of the equipment (e.g., a telephone company, a power utility, a wireless company, etc.). Phone no. field 673 and/or email field 675 may allow the user to enter a telephone number and/or email address, respectively, associated with the owner identified above in owner field 671.

Equipment type field 677 may allow the user to enter information that identifies a type of equipment (e.g., network device, a power and/or communication cable), a utility pole, etc. Adjacent equipment field 678 may allow the user to specify other equipment adjacent to and/or to which the equipment is connected or is to be connected. In one example, adjacent equipment field 678 may identify other equipment to which the equipment is connected via a network path (e.g., a transformer, a fiber optic cable, a power line, a communication line, an RF link, etc.) and/or may identifier the network path itself. In another example, adjacent equipment field 678 may allow the user to specify other equipment that is attached to the equipment (e.g., when the equipment is a utility pole), such as a power cable, a guy wire, a transformer, a communication line, an antenna, etc.

Recording button 679 may allow the user to take a picture and/or record a video of the equipment that is being surveyed and/or specified. Additionally, or alternatively, recording button 679 may allow user device 110 to store, in image/audio fields 681, an indication (e.g., such as a thumbnail image and/or some other indication.) that an image has been taken and/or a video has been recorded of the equipment as a result of taking the picture and/or recording the video. Additionally, or alternatively, recording button 679 may allow user device 110 to record an audio message (e.g., spoken by the user) that describes a piece of equipment, a condition and/or safety issue associated with the piece of equipment, etc. User device 110 may store, in image/audio fields 681, an indication (e.g., an icon associated with an audio message) that an audio message has been recorded.

Save button 683 may, when selected by the user, cause user device 110 to store, in a memory associated with user device 110, equipment information entered, by the user, via third user interface 660. Additionally, or alternatively, save button 683, when selected by the user, may cause user device 110 to transmit the equipment information to business server 150. Edit button 685 may, when selected by the user, allow the user to change equipment information entered via third user interface 660 and/or to add or delete an image in image field 681. Inventory button 687 may, when selected by the user, cause user device 110 to retrieve equipment information, associated with one or more pieces of equipment within a network (e.g., network 160), to be presented for display on user device 110 (e.g., as a table, a data structure or some other format).

Safety and maintenance button 689 may, when selected by the user, allow the user to provide information that identifies a condition, a safety issue, and/or a maintenance action associated with the piece of equipment. In one example, selection of safety and maintenance button 689 may cause a user interface to be displayed that allows the user to enter information associated with the condition (e.g., missing equipment, distances to adjacent equipment being greater than a threshold, etc.), a safety issue (e.g., damaged equipment, vandalism to the equipment, proximity to other equipment or objects, and/or other safety issues), etc. Selection of safety and maintenance button 689 may also, or alternatively, cause a notification to be transmitted, to business server 150, that indicates that a maintenance action is to be performed and/or that the condition and/or safety issue is associated with the equipment.

Returning to FIG. 5, process 500 may include receiving equipment information via the third user interface (block 545). For example, user device 110, may cause coordinates (e.g., 32.885591 and/or - 96.952837), associated with a current location of user device 110, to be entered, into third user interface 660 of FIG. 6C (e.g., in latitude field 665 and/or longitude field 667, respectively), as a result of the user selecting current location data item 640 of FIG. 6B in a manner similar to that described above with respect to block 540. In another example, user device 110 may cause the coordinates to be entered, into latitude field 665 and/or longitude field 667, as a result of the user selecting another point within second user interface 620 of FIG. 6B. In yet another example, the user may enter the coordinates (e.g., via a keypad associated with user device 110) into latitude field 665 and/or longitude field 667.

The user may enter, into equipment ID field 669 and/or equipment type field 678, an identifier (e.g., 260-34567-1) associated with the piece of equipment and/or information, that identifies a type of equipment (e.g., utility pole-electric), respectively. The user may enter, into owner field 761, information that identifies an owner of the equipment (e.g., Verizon). The user may enter, into phone field 673 and/or email field 675, information associated with the owner of the equipment, such as a telephone number (e.g., 123-456-7890) and/or an email address (e.g., vz.vzvz@verizon.com) respectively. The user may enter information that identifies one or more other pieces of equipment (e.g., 260-34566-1) that is adjacent to and/or connected with the equipment, such as another utility pole, a network device, etc. (e.g., as shown in adjacent equipment field 678).

The user may also, or alternatively, select recording button 679 to take one or more pictures or record one or more videos of the equipment. For example, the user may take a picture and/or record video of equipment information (e.g., a label, a tag, a placard, etc.) that is attached to or in the vicinity of a piece of equipment. User device 110 may process the picture and/or recorded video to obtain all or a portion of the equipment information from the picture and/or recorded video. User device 110 may populate fields, associated with third interface 660, with the equipment information obtained from the pictures and/or recorded video. User device 110 may receive the equipment information, via third interface 660, when the user, of user device 110, selects save button 683.

Figure 6D:
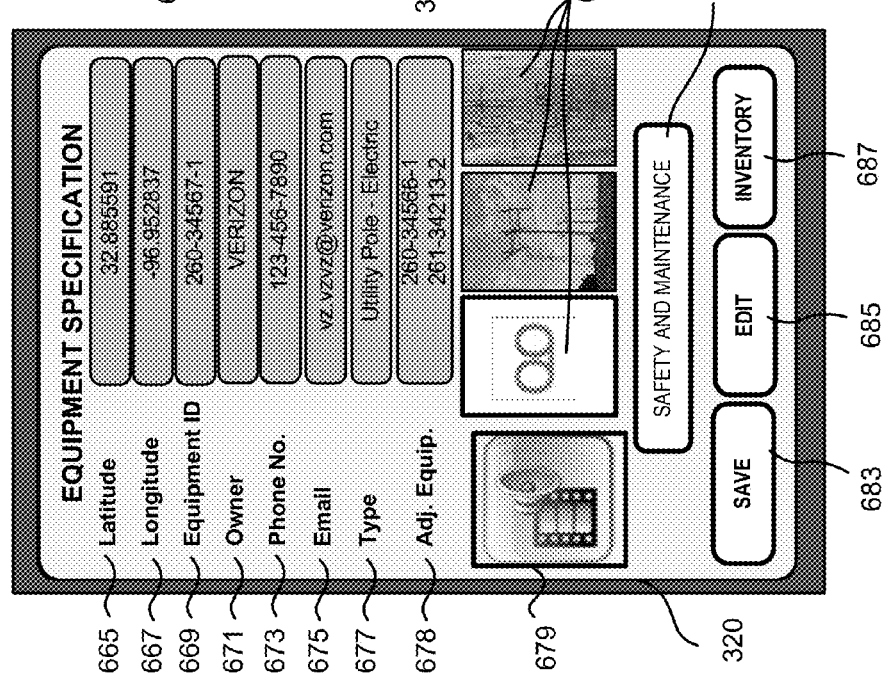

As further shown in FIG. 5, process 500 may include creating an equipment data item based on the equipment information and presenting the data item for display via the second user interface (block 550). For example, user device 110 may use the client application to create an equipment data item that represents the equipment, associated with the network (e.g., network 160), based on the equipment information received via third user interface 660. The client application may present the equipment data item, for display, via the second user interface, on user device 110. FIG. 6D is a diagram of second user interface 620 that includes equipment data item 690 that was created based on the equipment information received via third user interface 660 of FIG. 6C. The location of equipment data item 690, within second user interface 620, may correspond to current location data item 640 of FIG. 6B and/or another point, within second user interface 620, that the user selected to create equipment data item 690 of FIG. 6D.

Additionally, or alternatively, the client application may create a connector data item (e.g., connector data item 692 of FIG. 6D) that represents a network path that connects the equipment to an adjacent piece of equipment. In one example, the client application may automatically generate connector data item 692 based on the equipment information (e.g., received via adjacent equipment data item 678 of FIG. 6C). The equipment information may indicate that connector data item 692 corresponds to network path (e.g., a communication line, a fiber optic cable, an RF link, etc.) and/or some other type of equipment.

In another example, equipment data item 690 and/or connector data item 692 may be automatically created, by user device 110, based on a determination that a condition is associated with the network. The determination of the condition will be described in greater detail below with respect to block 555.

Additionally, or alternatively, the user may select legacy equipment data item 635, via second user interface 620 of FIG. 6D, which may cause user device 110 to retrieve, from a memory associated with user device 110, equipment information associated with the selected legacy equipment data item 635. User device 110 may present the equipment information (e.g., via text box 695) for display via second user interface 620 of FIG. 6D, which allows the user to view the equipment information associated with the selected legacy equipment data item 635. The user may select text box 695, which may allow the user to edit the equipment information associated with the selected legacy equipment data item 635. In one example, the client application may cause third user interface 660, of FIG. 6C, to be displayed on user device 110, which may allow the user to edit the equipment information via third user interface 660.

Returning to FIG. 5, if a condition is associated with the equipment data item (block 555-YES), then process 500 may include presenting, for display, the third user interface that allows the equipment to be specified (block 540). For example, user device 110 may use the client application to determine whether a condition is associated with equipment data item 690 of FIG. 6D. For example, the client application may determine that a condition is associated with equipment data item 690, when the equipment information, associated with equipment data item 690, was not entered correctly, via third user interface 660 of FIG. 6C. The client application may determine that the equipment information was not entered correctly when one or more fields associated with third user interface 660 are left blank, coordinates are not located within a geographic area associated with network 160, an email or phone number does not conform to a particular format, etc.

Additionally, or alternatively, the client application may identify that a condition, is associated with equipment data item 690 when a length of a span, associated with connector data item 692 between equipment data item 690 and legacy equipment data item 635 (e.g., associated with an adjacent piece of equipment), is greater than a first threshold. The length of the span may be determined based on a distance between a first location associated with equipment data item 690 and a second location associated with legacy equipment data item 635 (e.g., obtained from equipment information associated with legacy equipment data item 635).

If equipment data item 690 corresponds to a utility pole, the client application may also, or alternatively, determine whether an angle (e.g., shown as "θ" in FIG. 6D) associated with one or more connector data items 692 to which equipment data item 690 is connected, is less than a second threshold. The angle may be measured between a first connector data item 692 (e.g., that connects equipment data item 690 to a first legacy equipment data item 635) and a second connector data item 692 (e.g., that connects equipment data item 690 to a second legacy equipment data item 635). Based on a determination that the angle is less than the second threshold, the client application may determine that a condition is associated with equipment data item 690.

Additionally, or alternatively, if equipment data item 690 corresponds to a utility pole, the client application may determine whether a quantity of devices, that are attached to the utility pole (e.g., such as a transformer, a power line, a telephone line, a transformer, an antenna, a guy wire, etc.), are greater than a third threshold. Based on a determination that the quantity of devices that are attached to the utility pole is greater than the third threshold, the client application may determine that a condition is associated with equipment data item 690. The types of conditions, described above, are provided for explanatory purposes. In another implementation, other types of conditions are possible.

Additionally, or alternatively, user device 110 may determine that a condition exists when user device 110 identifies missing and/or inaccessible equipment. User device 110 may, for example, identify missing equipment when a first identifier (e.g., a first equipment identifier 103), associated with a first piece of equipment is out-of-order and/or is not sequential relative to a second identifier (e.g., second equipment identifier 105) associated with a second piece of equipment.

Based on the determination that a condition is associated with equipment data item 690, the client application may cause user device 110 to present the third user interface (e.g., third user interface 660 of FIG. 6C) for display. Presenting the third user interface for display may allow the user to edit the equipment information (e.g., by selecting edit button 685 of FIG. 6C) to remedy the condition. For example, the user may enter equipment information into fields that have been left blank and/or to correct a format associated with an email address, a telephone number, etc. Additionally, or alternatively, the user may enter revised location coordinates, associated with equipment data item 690 and/or legacy equipment data item 635, to reduce the length of the span to a length that is not be greater than the first threshold. The user may also, or alternatively, revise the location coordinates to cause the angle (e.g., θ), between the first connector data item 692 and the second connector data item 692, to be increased to another angle that is not less than the second threshold. In another example implementation, the client application may generate the one or more revised location coordinates from which the user may select to remedy the condition.

If the condition is associated with missing and/or inaccessible equipment, user device 110 may automatically generate equipment information associated with the missing and/or inaccessible equipment. User device 110 may generate the equipment information based on equipment information associated with equipment that is adjacent to proposed equipment with which the generated equipment information is associated. For example, user device 110 may generate equipment information associated with a proposed third piece of equipment (e.g., associated with a third equipment identifier 104) and/or equipment that connects the third piece of equipment with the adjacent pieces of equipment. The proposed equipment may be represented by created equipment data items 690 and/or connector data items 692 within second user interface 620 of FIG. 6D.

In an example implementation, one or more equipment data items 690 may be displayed, via second user interface 620 that represent different types of proposed equipment (e.g., utility poles, fiber optic cables, network devices, etc.) associated with a planned network path within a network. Equipment information that specifies the types, locations, sizes and/or capacities, etc., of the proposed equipment, may be automatically generated by user device 110 and/or may be entered by the user of user device 110 (e.g., via third user interface 660 of FIG. 6C).

If a condition is not associated with the equipment data item (block 555- NO), then process 500 may include storing the equipment information (block 560) and/or transmitting equipment information (block 565). For example, user device 110 may determine that the equipment information has been correctly and/or completely entered and/or received via the third user interface. Additionally, or alternatively, user device 110 may determine that a condition, associated with equipment data item 690 does not exist when the length of the span, associated with connector data item 692, is not greater than the first threshold. User device 110 may also, or alternatively, determine that a condition does not exist when the angle (e.g., θ), associated with the one or more connector data items 692, to which equipment data item 690 is connected, is not less than the second threshold. User device 110 may also, or alternatively, determine that the quantity of devices that are connected to equipment data item 690 is not greater than the third threshold.

Based on the determination that a condition is not associated with equipment data item 690, user device 110 may store, in a memory associated with user device 110, the equipment information on which equipment data item 690 is based. Additionally, or alternatively, user device 110 may transmit the equipment information to, for example, business server 150. In an example implementation, user device 110 may stream the equipment information, on a near real-time basis, to business server 150.

The user, of user device 110, may enter, via the third user interface (e.g., third user interface 660 of FIG. 6C), other equipment information pertaining to other equipment associated with the network (e.g., network 160). User device 110 may generate other equipment data items 690 based on the other equipment information. User device 110 may store the other equipment information and/or may transmit, to business server 150, the other equipment information.

Business server 150 may receive the equipment information and/or the other equipment information and may store, in a memory associated with business server 150, the equipment information and/or the other equipment information. In another example implementation, business server 150 may, in a manner similar to that described above with respective to block 555, determine whether a condition, associated with the equipment information and/or the other equipment information, exists. Business server 150 may, based on a determination that a condition exists, transmit a notification, to user device 110, indicating that a condition exists with respect to the equipment information and/or the other equipment information. User device 110 may receive the notification and may, in a manner similar to that described above with respect to block 540, present the third user interface, for display, that allows the user to edit the equipment information and/or the other equipment information to remedy the condition.

A system and/or method, described herein, may enable a user device to perform a survey of equipment associated with a network. The system and/or method may allow the user device to identify a location of a piece of equipment, when a user, of the user device, is located adjacent to the equipment and instructs the user device to store a geographic location associated with the user device. The system and/or method may allow equipment information, associated with equipment, to be specified by the user and/or stored on the user device. The system and/or method may allow the user device to transmit the equipment information to a business server that maintains an inventory associated with equipment associated with the network.

The system and/or method may allow the user device to obtain information associated with a geographic area in which the user device is located and may present a user interface that includes the information associated with the geographic area. The system and/or method may allow the user device to present, via the user interface, one or more data items that represent one or more pieces of equipment, associated with a network within the geographic area, based on the equipment information. The system and/or method may allow a user to select a data item, via the user interface, which may cause the user device to display, via the user interface, equipment information associated with the selected data item. The system and/or method may allow the user to add or delete a data item via the user interface. Adding or deleting the data item may indicate that equipment is to be installed within or removed from the geographic area, respectively, at a location that corresponds to a point, within the user interface, identified by the user. The user device may transmit a notification indicating that the equipment is to be installed at or removed from the location that corresponds to the point, within the user interface, that the data item was added or removed, respectively. The system and/or method may determine that a condition is associated with the equipment information and may allow the user to edit the equipment information to remedy the condition.

The foregoing description provides illustration and description, but is not intended to be exhaustive or to limit the implementations to the precise form disclosed. Modifications and variations are possible in light of the above teachings or may be acquired from practice of the embodiments.

While a series of blocks have been described with regard to FIGS. 4 and 5, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code--it being understood that software and control hardware can be designed to implement the systems and methods based on the description herein.

Further, certain portions, described above, may be implemented as a component or logic that performs one or more functions. A component or logic, as used herein, may include hardware, such as a processor, an ASIC, or a FPGA, or a combination of hardware and software (e.g., a processor executing software).

It should be emphasized that the terms comprises and comprising, when used in this specification, are taken to specify the presence of stated features, integers, steps or components but do not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a user device, a request to perform a survey of telecommunications equipment within a telecommunications network;
   presenting for display, on the user device and based on the request, a map associated with a geographic area, where the map includes data items that represent the telecommunications equipment;
   detecting, by the user device and via the map, selection of a data item that represents a first piece of telecommunications equipment,
      the first piece of telecommunications equipment being a first utility pole provided at a first location;
   identifying, by the user device and as a result of detecting the selection of the data item, the first location associated with the first piece of telecommunications equipment;
   providing a user interface that allows first equipment information, associated with the first piece of telecommunications equipment, to be entered, where the first equipment information includes:
      information associated with the first location, and
      information that uniquely identifies the first piece of telecommunications equipment;
   retrieving, from a memory associated with the user device, second equipment information, associated with a second piece of telecommunications equipment that is adjacent to or connected to the first piece of telecommunications equipment,
      the second piece of telecommunications equipment being a second utility pole provided at a second location, different than the first location;
   determining, by the user device, whether a condition is associated with the first piece of telecommunications equipment or the second piece of telecommunications equipment,
      the condition being determined based on the first location and the second location, associated with the second piece of telecommunications equipment, identified by the second equipment information, the condition including a distance, between the first location and the second location, failing to satisfy a threshold,
      the condition providing an indication that a third piece of telecommunications equipment needs to be installed between the first piece of telecommunications equipment and the second piece of telecommunications equipment;
   providing, by the user device and to a server device associated with the telecommunications network, a notification indicating the condition when the condition is associated with the first piece of telecommunications equipment or the second piece of telecommunications equipment; and
   transmitting, by the user device and to the server device, the first equipment information when the condition is not associated with the first piece of telecommunications equipment or the second piece of telecommunications equipment.

2. The method of claim 1, where a network node is provided at the first utility pole.

3. The method of claim 1, where identifying the first location includes:
   identifying a location associated with the user device, where identifying the location associated with the user device includes at least one of:
      computing first location coordinates, that correspond to the location associated with the user device, based on communications with one or more base stations, or
      obtaining second location coordinates, that correspond to the location associated with the user device, based on a global positioning satellite (GPS) system; and
   setting the first location approximately equal to the location associated with the user device.

4. The method of claim 1, where identifying the first location includes:
   identifying a point, within the map, that corresponds to the selected data item; and
   determining that the first location is associated with a geographic location that corresponds to the point within the map.

5. The method of claim 1, further comprising:
   receiving, via the map, selection of another data item that corresponds to a fourth piece of telecommunications equipment;
   retrieving, from the memory, equipment information associated with the other data item; and
   presenting, for display, the equipment information associated with the other data item.

6. The method of claim 1, further comprising:
receiving, via the map, selection of a point that does not correspond to any of the data items;
identifying a location, within the geographic area, that corresponds to the selected point; and
presenting, for display, another user interface that allows a user to enter equipment information associated with a fourth piece of telecommunications equipment, where the other user interface includes coordinates associated with the identified location within the geographic area.

7. The method of claim 6, further comprising:
creating another data item that corresponds to the equipment information associated with the fourth piece of telecommunications equipment; and
presenting, for display and via the map, the other data item at the selected point.

8. The method of claim 1, further comprising:
presenting, for display, the user interface that includes the first equipment information, where the user interface allows a user, of the user device, to modify the first equipment information to remedy the condition.

9. The method of claim 8, where modifying the first equipment information causes an operation to be performed to install the third piece of telecommunications equipment between the first piece of telecommunications equipment and the second piece of telecommunications equipment.

10. A user device, comprising:
a memory to store equipment information associated with telecommunications equipment within a telecommunications network, where the equipment information identifies one or more geographic locations associated with the telecommunications equipment or respective ownership of each piece of the telecommunications equipment; and
one or more processors to:
receive a request to survey the telecommunications equipment,
present, for display and based on the request, a first user interface that identifies a geographic area and one or more data items, associated with the telecommunications equipment, that are located within the geographic area,
receive, via the first user interface, selection of a point, within the first user interface, that corresponds to a first location associated with a first piece of telecommunications equipment, within the geographic area,
the first piece of telecommunications equipment being a first utility pole provided at the first location,
present, for display, a second user interface that allows a user to specify first equipment information associated with the first piece of telecommunications equipment,
the first equipment information including information associated with the first location and information that identifies the first piece of telecommunications equipment,
retrieve, from the memory, second equipment information, associated with a second piece of telecommunications equipment that is adjacent to or connected to the first piece of telecommunications equipment,
the second piece of telecommunications equipment being a second utility pole provided at a second location, different than the first location,
determine whether a condition is associated with the first piece of telecommunications equipment based on the first equipment information or second equipment information associated with the second piece of telecommunications equipment,
the condition being determined based on the first location and the second location, associated with the second piece of telecommunications equipment, identified by the second equipment information,
the condition including a distance, between the first location and the second location, failing to satisfy a threshold,
the condition providing an indication that a third piece of telecommunications equipment needs to be installed between the first piece of telecommunications equipment and the second piece of telecommunications equipment,
store, in the memory, the first equipment information when the condition is not associated with the first piece of telecommunications equipment or the second piece of telecommunications equipment, and
output a notification indicating the condition when the condition is associated with the first piece of telecommunications equipment or when the condition is associated with the second piece of telecommunications equipment.

11. The user device of claim 10, where the one or more processors are further to:
transmit, to a server device associated with the telecommunications network, the first equipment information when the condition is not associated with the first piece of telecommunications equipment or the second piece of telecommunications equipment.

12. The user device of claim 10, where the one or more processors are further to:
create a data item, associated with the first piece of telecommunications equipment and within the first user interface, that corresponds to the selected point when the condition is not associated with the first piece of telecommunications equipment.

13. The user device of claim 10, where the one or more processors are further to:
identify, based on the request, a location associated with the user device,
transmit, to a server device, another request for information associated with the geographic area, where the other request includes information associated with the location of the user device,
receive, from the server device, the information associated with the geographic area, and
present the information, associated with the geographic area, for display via the first user interface.

14. The user device of claim 10, where the first user interface allows a user, of the user device, to:
select a first point, within the first user interface, that corresponds to the first location at which the first piece of telecommunications equipment is located, or
select a second point, within the first user interface, that corresponds to the second location.

15. The user device of claim 10, where the one or more processors are further to:
detect that the second piece of telecommunications equipment is identified in the first equipment information; and
retrieve, from the memory, the second equipment information based on detecting that the second piece of telecommunications equipment is identified in the first equipment information.

16. The user device of claim 10, where, when determining whether the condition is associated with the first piece of telecommunications equipment or the second piece of telecommunications equipment, the one or more processors are to:
- identify a first distance associated with a first network path that connects the first piece of telecommunications equipment to the second piece of telecommunications equipment,
- identify a second distance associated with a second network path that connects the first piece of telecommunications equipment to the third piece of telecommunications equipment, and
- determine that the condition is associated with the first piece of telecommunications equipment when the first distance or the second distance is greater than another threshold.

17. The user device of claim 10, where, when determining whether the condition is associated with the first piece of telecommunications equipment or the second piece of telecommunications equipment, the one or more processors are to:
- identify an angle between a first span of a network path that connects the first piece of telecommunications equipment to the second piece of telecommunications equipment and a second span of the network path that connects the first piece of telecommunications equipment to the third piece of telecommunications equipment, and
- determine that the condition is associated with the first piece of telecommunications equipment when the angle between the first span of the network path and the second span of the network path is less than another threshold.

18. The user device of claim 10, where, when outputting the notification, the one or more processors are to:
- perform an operation to remedy the condition that allows at least one of:
  - third equipment information, associated with the third piece of telecommunications equipment, to be generated,
  - the first equipment information to be modified, or
  - the second equipment information to be modified, and
- output, to a server device with which a maintenance team is associated, an instruction that causes the maintenance team to at least one of:
  - install the third piece of telecommunications equipment based on the third equipment information,
  - modify the first piece of telecommunications equipment based on the modified first equipment information, or
  - modify the second piece of telecommunications equipment based on the modified second equipment information.

19. A non-transitory computer-readable medium for storing instructions, the instructions comprising:
- one or more instructions that, when executed by one or more processors of a user device, cause the one or more processors to:
  - receive a request to perform a survey of telecommunications equipment associated with a telecommunications network,
  - present for display and based on receiving the request, a user interface that allows a user, of the user device, to input first equipment information, associated with a first piece of telecommunications equipment, where the first equipment information includes:
    - information that identifies the first piece of telecommunications equipment,
    - information associated with a first location of the first piece of telecommunications equipment,
    - the first piece of telecommunications equipment being a first utility pole provided at the first location, and
    - information that identifies ownership of the first piece of telecommunications equipment,
  - receive, via the user interface, the first equipment information,
  - retrieve, from a memory associated with the user device, second equipment information, associated with a second piece of telecommunications equipment that is adjacent to or connected to the first piece of telecommunications equipment,
    - the second piece of telecommunications equipment being a second utility pole provided at a second location, different than the first location,
  - determine whether a condition is associated with the first piece of telecommunications equipment or the second piece of telecommunications equipment,
    - the condition being determined based on the first location and the second location, associated with the second piece of telecommunications equipment, identified by the second equipment information,
    - the condition including a distance, between the first location and the second location, failing to satisfy a first threshold,
    - the condition providing an indication that a third piece of telecommunications equipment needs to be installed between the first piece of telecommunications equipment and the second piece of telecommunications equipment,
  - provide, to a server device associated with the telecommunications network, a notification indicating the condition when the condition is associated with the first piece of telecommunications equipment or the second piece of telecommunications equipment, and
  - transmit the first equipment information to the server device when the condition is not associated with the first piece of telecommunications equipment or the second piece of telecommunications equipment.

20. The non-transitory computer-readable medium of claim 19, further comprising:
- one or more instructions that, when executed by the one or more processors, cause the one or more processors to:
  - present, for display, an instruction to edit the first equipment information when the condition is associated with the first piece of telecommunications equipment.

21. The non-transitory computer-readable medium of claim 19,
- where the first equipment information identifies one or more types of devices that are attached to the first utility pole, and
- where the one or more types of devices, that are attached to the first utility pole, include at least one of: a power line, a fiber optic cable, a transformer, a communication line, or a radio frequency antenna.

22. The non-transitory computer-readable medium of claim 21, where the one or more instructions that cause the one or more processors to determine whether the condition is associated with the first piece of telecommunications equipment or the second piece of telecommunications equipment, cause the one or more processors to:
- determine that the condition is associated with the first piece of telecommunications equipment when a quantity, associated with the one or more types of devices, that are attached to the first utility pole, is greater than another threshold.

23. The non-transitory computer-readable medium of claim 19, where the one or more instructions that cause the one or more processors to transmit the first equipment information to the server device, cause the one or more processors to:
    transmit the first equipment information, to the server device, using a streaming video protocol or streaming audio protocol that allows the first equipment information to be transmitted, to the server device, on a near real-time basis.

24. The user device of claim 10, further comprising:
a camera component to:
    allow an image, associated with the first piece of telecommunications equipment, to be taken or included in the first equipment information, or
    allow a video, associated with the first piece of telecommunications equipment, to be recorded or included in the first equipment information.

25. The user device of claim 10, further comprising:
an audio recorder component to:
    allow an audio message, associated with the first piece of telecommunications equipment, to be recorded or included in the first equipment information.

\* \* \* \* \*